Figure 1:
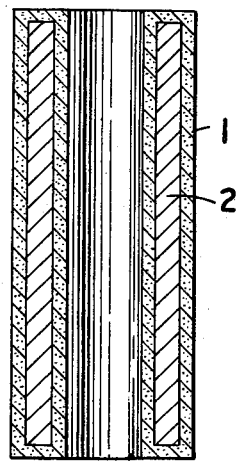

July 11, 1961  A. BLAINEY ET AL  2,992,172
FUEL ELEMENTS FOR NUCLEAR REACTORS
Filed Nov. 26, 1951

ALAN BLAINEY,
HENRY LLOYD,
Inventors
By
Attorney

United States Patent Office 2,992,172
Patented July 11, 1961

2,992,172
FUEL ELEMENTS FOR NUCLEAR REACTORS
Alan Blainey and Henry Lloyd, Strand, London, England, assignors, by mesne assignments, to the United States of America as represented by the United States Atomic Energy Commission
Filed Nov. 26, 1951, Ser. No. 258,164
8 Claims. (Cl. 204—154.2)

This invention relates to fuel elements for nuclear reactors and has for object to provide a method of preparing sheathed fuel elements having a tubular form and good thermal contact between fuel and the sheath.

According to the invention a tubular body of fissile material is provided with a sheath of a protective substance of low thermal neutron absorption cross section by compacting layers of the powder protective substance over the outer and end faces of the tubular body and in the space between the inner face of the tubular body and a core member conforming to the said inner face, while the whole is heated to sintering temperature of the protective substance, the core being such that under the conditions of compaction it has the quality of deforming and/or flowing to transmit isotropic pressure.

The core may conveniently be of lead, tin, bismuth or other low melting point metal or alloy, in which case it may subsequently be removed from theh sheathed body of fissile material by heating the latter to the melting point of the core or it may be of a relatively soft metal of higher melting point, preferably copper. Preferably a thin sheet of tough metal, for example steel, is arranged about a core of low melting point metal or alloy to prevent the core substance from penetrating the powder layer which forms the inner portion of the sheath under the influence of the compacting pressure.

The fissile material may be uranium metal enriched in U-235, or containing Pu-239 or U-233. The protective substance is preferably beryllium, although other metals of low thermal neutron absorbtion cross section may be used, for example, zirconium, niobium and nickel.

In carrying the invention into effect according to a preferred method as applied to the production of a tubular nuclear fuel element comprising uranium metal enriched in U-235 sheathed in beryllium, a demountable die, preferably a metal of small creep at 800° C., for example Mond nickel-chromium alloy "Nimonic" or nickel titanium carbide is used, the die cavity being of the diameter of the desired fuel element. A suitable die is illustrated in application Serial No. 95,427 filed May 26, 1949 of Alan Blainey, now Patent No. 2,938,791, issued May 31, 1960. Into the die is introduced a core member of low melting point metal e.g. lead having wrapped around its cylindrical surface a thin sheet of tough metal, preferably nickel or steel or a core of a relatively soft metal preferably copper. The outer diameter of the core member should be a little less than the desired internal diameter of the fuel element and the length a little greater than the length of the finished sheathed element. A uniform layer of beryllium powder is then laid on the bottom of the die in the space between the cylindrical die walls and the core. The depth of the layer should be such as to give on compaction the desired end thickness of the sheath. The tubular uranium is then introduced and disposed mid-way between the die walls and the core member. The uranium is preferably slit along its length in one or more places. Beryllium powder is then added to fill the space between the uranium and the cylindrical die walls and the core member and provide a layer over the uranium equal to that placed at the bottom of the die and to fill the slits in the uranium. Stemming of the powder may be found desirable to reduce the contraction on compaction; or it may be found preferable to pre-form the inner and outer cylindrical walls of the sheath, and possibly the end caps, by cold compaction of the beryllium powder mixed with a small propertion of a polythene wax in dies of the appriate size at the compacting pressure to be employed, and the preforms may then be assembled with the uranium and core member in the die, beryllium being introduced into the slits in the uranium as before.

The upper compression member of the die is brought into position and the whole charge is subjected to a presure of substantially 10 tons per square inch while the die and contents are heated to a temperature of about 800° C. as by electrical heating of the die body. To avoid oxidation of the beryllium and uranium during the treatment, the beryllium may be coated with a hydrocarbon oil before introduction into the die or an atmosphere of argon or other inert gas maintained in the die during the heating, or the operation may be carried out in vacuo. If pre-forms containing polythene wax are used, the necessary protective atmosphere will be supplied by the wax. When lead or other metal molten at the operating temperature is employed the plungers of the die are preferably water cooled to prevent molten core metal being forced out of the die, or other precautions may be taken to prevent such discharge of metal from the die.

After the die has been allowed to cool, the sintered product is removed and, in the case where lead is used for the core, is heated to the melting point of lead so that the core will flow out. The thin steel sheet will have become united with the inner beryllium surface of the fuel element and may be removed by machining or the steel may be dissolved in aqueous nitric acid, which will not dissolve the beryllium. Where copper is used for the core, it may be largely removed by machining and the residue dissolved in dilute nitric acid.

Figure 2:
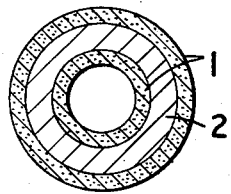

In the accompanying drawing FIG. 1 is a longitudinal cross section of a nuclear fuel element according to the invention and FIG. 2 is a transverse cross section of the element.

The nuclear fuel 2 comprising natural uranium with added U-235 is contained in a sintered compacted sheath 1 of beryllium or zirconium.

We claim:

1. A method of sheathing a tubular fuel element for a nuclear reactor comprising centering a core member consisting of a metal selected from the group consisting of lead, tin, bismuth and copper in a die, placing a layer of a protective sheathing substance in powder form on the bottom of the die, introducing the tubular fuel element of fissile material into the die midway between the die walls and the core member, filling the spaces between the tubular fuel element and the die walls and core member with the said protective substance in powder form, providing a layer of said protective sheathing substance in powder form over the tubular fuel element equal to that placed at the bottom of the die, subjecting the charge within the die to pressure in the direction of the axis of the fuel element at the sintering temperature of the protective substance and removing the core.

2. The method according to claim 1 wherein the core metal melts at a temperature below the sintering temperature of the protective substance and is surrounded by a thin sheet of steel.

3. The method according to claim 2 wherein the core is removed by melting and pouring the molten metal therefrom.

4. The method according to claim 3 wherein the core member is formed of lead.

5. The method according to claim 1 wherein the core member is formed of copper.

6. The method according to claim 1 wherein the protective substance is a metal of low thermal neutron absorption cross section selected from the group consisting of beryllium, zirconium, niobium and nickel.

7. The method according to claim 6 wherein the protective substance is beryllium.

8. A method of sheathing a tubular fuel element for a nuclear reactor comprising centering a core member formed of lead and surrounded with a thin sheet of steel in a die, placing a layer of powdered beryllium on the bottom of the die, introducing the tubular fuel element formed of uranium into the die midway between the die walls and the core member, filling the space between the tubular fuel element and the die walls and the core member with beryllium powder, providing a layer of beryllium powder over the uranium tube equal to that placed at the bottom of the die, subjecting the charge within the die to a pressure of ten tons per square inch in the direction of the axis of the fuel element at a temperature of 800° C. while cooling the plungers of the die, cooling the die, removing the core member from the fuel element by melting the lead and pouring it therefrom, and removing the thin steel sheet from the fuel element.

References Cited in the file of this patent

UNITED STATES PATENTS

| | | |
|---|---|---|
| 1,226,470 | Coolidge | May 15, 1917 |
| 1,555,578 | Howe | Sept. 29, 1925 |
| 1,648,678 | Ehlers | Nov. 8, 1927 |
| 1,685,915 | Gero | Oct. 2, 1928 |
| 2,313,227 | DeBats | Mar. 9, 1943 |
| 2,373,405 | Lowit | Apr. 10, 1945 |
| 2,466,432 | Jenkins | Apr. 5, 1949 |
| 2,477,601 | Hanson | Aug. 2, 1949 |
| 2,628,166 | Haller | Feb. 10, 1953 |
| 2,696,652 | Cronin | Dec. 14, 1954 |
| 2,743,226 | Newson | Apr. 24, 1956 |

OTHER REFERENCES

Beckerley: Nucleonics, vol. 12, No. 4, April 1954, page 15.